United States Patent Office 2,748,147
Patented May 29, 1956

2,748,147

2,5 - DIALKOXY - 3,4 - DIHYDROXYTETRAHYDROFURANS AND THEIR HYDROLYSATES, AND METHODS OF PRODUCING THEM

Niels Konrad Friedrich Wilhelm Clauson-Kaas, Klampenborg, Denmark, assignor to A/S Sadolin & Holmblad, Copenhagen, Denmark No Drawing. Application June 23, 1952, Serial No. 295,126

Claims priority, application Denmark July 5, 1951

9 Claims. (Cl. 260—347.4)

This invention relates to 2,5-dialkoxy-3,4-dihydroxytetrahydrofurans of the general formula:

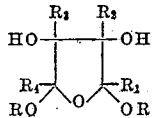

where R designates alkyl groups, and $R_1$, $R_2$, $R_3$ and $R_4$ designate hydrogen, alkyl groups or aliphatic groups containing only carbon, hydrogen and oxygen atoms.

The invention further relates to hydrolysates of the said components and to methods for the production of the compounds and hydrolysates.

The compounds of the invention are hitherto unknown substances which are acetals of 2,3-dihydroxy-1,4-dicarbonyl compounds. By the hydrolysis dicarbonyl compounds are obtained, which are useful as intermediates in the synthesis of alkaloids of the tropinone series and may also find use in the production of otherwise difficultly accessible carbohydrates.

The objects of the invention will appear from the above and from the following detailed description of preferred embodiments of the invention, but it should be understood that the scope of the invention is not to be limited by the following particulars, since modifications will be obvious to anyone skilled in the art.

According to the invention 2,5-dialkoxy-2,5-dihydrofurans of the following general formula:

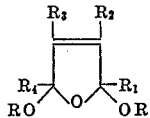

where R, $R_1$, $R_2$, $R_3$ and $R_4$ have the above significance, are treated with an oxidizing agent, which hydroxylates the double bond, whereafter the resulting 3,4-dihydroxy compounds are isolated and, if desired, hydrolyzed in known manner. An alkali permanganate, such as potassium permanganate, is preferably used as the oxidizing agent, and the oxidation is expediently carried out in aqueous solution at a temperature below 5° C.

The 2,5-dialkoxy-2,5-dihydrofurans used in the reaction are preferably those which are produced as described in my co-pending application, Serial No. 163,801, filed May 23, 1950 now abandoned.

Using 2,5-dimethoxy-2,5-dihydrofuran as a starting material, the reaction is illustrated by the following scheme:

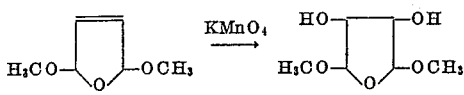

Thereby the permanganate is reduced to manganese dioxide which is precipitated and may be removed by filtration.

The resulting 2,5-dimethoxy-3,4-dihydroxytetrahydrofuran may be hydrolyzed to tartaric dialdehyde according to the following scheme:

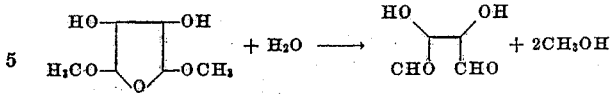

In the following the invention will be illustrated by some examples.

Example 1

39.0 g. (0.30 mole) of 2,5-dimethoxy-2,5-dihydrofuran (technical quality, produced by electrolysis) are dissolved in 600 ccs. of water and cooled to 0° C. while stirring vigorously. During 1 hour a solution of 36.0 g. of potassium permanganate in 900 ccs. of water is added, care being taken that the temperature does not exceed 5° C. The permanganate is used momentaneously. By a short heating to 65° C. the colloidally precipitated manganese dioxide is brought into a filterable form and may be filtered off after cooling. The manganese dioxide is further washed with 300 ccs. of water, which are added to the filtrate. 750 g. of potassium carbonate are also added, and the filtrate is then continuously extracted with ether. The ether solution is dried with sodium sulphate and evaporated in vacuum. The residue, amounting to 26 g., is distilled in vacuum. Thereby 10.2 g. or 26% of the starting material is regained and there is further obtained 13.5 g. of 2,5-dimethoxy-3,4-dihydroxy-tetrahydrofuran, the boiling point of which at 11 mm. of mercury is 160° C., and the refractive index $n_D$ at 25° C. of which is 1.452–1.454. The product is a colourless, viscous oil, in some cases crystallizing partly. It is probably a mixture of different stereoisomers.

Probably, the product is a mixture of different stereoisomers.

The oxidation may also be carried out at a lower temperature, for instance at —20° C., using a mixture of acetone and water as a solvent, the yield being about the same as by the above method.

The tetrahydrofurans may be hydrolyzed as follows.

0.25 g. of 2,5-dimethoxy-3,4-dihydroxy-tetrahydrofuran are dissolved in 2 ccs. of decinormal sulphuric acid and left standing for 3 hours at room temperature. Thereby tartaric dialdehyde is formed and may be isolated as a bis-phenylhydrazone in the following manner. 2 ccs. of water, 3-normal acetic acid solution and 4-normal sodium acetate solution, respectively, are added together with 0.4 ccs. of phenylhydrazine. A slightly yellow precipitate of bis-phenylhydrazone is recovered and re-crystallized from acetone-benzene and is now pure white with melting point 193–194° C.

Example 2

The method described in Example 1 is applied to 15.8 g. (0.10 mole) of 2,5-diethoxy-2,5-dihydrofuran resulting in 5.5 g. of 2,5-diethoxy-3,4-dihydroxy-tetrahydrofuran, which is a colourless oil, the boiling point of which at 9 mm. is 157–158° C. and the refractive index of which $n_D$ at 25° C. is 1.449.

Example 3

Applying the method of Example 1 to 18.6 g. (0.10 mole) of di-n-propoxy-2,5-dihydrofuran results in 4.1 g. of 2,5-di-n-propoxy-3,4-dihydroxy-tetrahydrofuran which is a colourless liquid boiling at 171–172° C. at 9 mm. and having the refractive index $n_D$ at 25° C. = 1.447.

Example 4

Using 18.6 g. (0.10 mole) of 2,5-diisopropoxy-2,5-dihydrofuran as a starting material in a method as described in Example 1, 6.9 g. of 2,5-diisopropoxy-3,4-dihydroxy-tetrahydrofuran are obtained as colourless crystals, melting at 51–52° C.

Example 5

20.2 g. of 2,5-dimethoxy-2,5-dihydrofurfuryl acetate (0.10 mole) are dissolved in 200 ccs. of water and 12.0 g. of potassium permanganate (0.076 mole) dissolved in 300 ccs. of water are added during 30 minutes as described in Example 1. Then 71.5 ccs. of normal sulphuric acid and 1.0 ccs. of normal acetic acid are added, and the mixture is extracted continuously with benzene during 20 hours. From the solution in benzene 7.96 g.=39% of the starting material may be regained. From the aqueous phase manganese dioxide is removed by filtration, and the filtrate is extracted continuously with ether during 24 hours. The ethereal solution yields 2.27 g. of 2,5-dimethoxy-3,4-dihydroxy-tetrahydrofurfuryl acetate, B. P.$_{0.4}$=133–137° C., $n_D^{25}$=1.460.

Example 6

18.8 g. of 2,5-dimethoxy-2,5-dihydropyromusic acid methyl ester is treated as described in Example 5. From the benzene solution 5.6 g.=30% of the starting material is regained, and the ethereal solution yields 4.2 g. of 2,5-dimethoxy - 3,4 - dihydroxy - tetrahydropyromusic acid methyl ester, B. P.$_{1.0}$=146–150° C., $n_D^{25}$=1.463.

Example 7

20.4 g. of 2,5-dimethoxy-2,5-dihydrofurfuryl dimethylacetal (0.10 mole) is reacted as described in Example 1, whereby 3.8 g. of the starting material is regained, and there is obtained 0.7 g. of 2,5 - dimethoxy - 3,4-dihydroxy-tetrahydrofurfuraldimethyl acetal, B. P.$_{16}$=171–175° C., $n_D^{25}$=1.453

I claim:

1. 2,5 - dialkoxy - 3,4 - dihydroxy - tetrahydrofurans of the general formula:

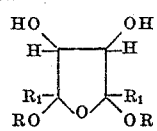

where R is an alkyl group containing less than 7 carbon atoms and R$_1$ is selected from the group consisting of hydrogen, an alkyl group containing less than 4 carbon atoms, and the following saturated aliphatic groups comprising carbon, hydrogen and oxygen only, containing less than 4 carbon atoms: —CH$_2$—O-(lower fatty acid acyl); —CH(O-lower alkyl)$_2$; and —COO-(lower alkyl).

2. 2,5-dimethoxy-3,4-dihydroxy-tetrahydrofuran.
3. 2,5-diethoxy-3,4-dihydroxy-tetrahydrofuran.
4. 2,5-dimethoxy-3,4 - dihydroxy - tetrahydrofurfuryl acetate.
5. 2,5-dimethoxy - 3,4 - dihydroxy - tetrahydropyromusic acid methyl ester.
6. 2,5 - dimethoxy-3,4 - dihydroxy-tetrahydrofurfural dimethyl acetal.
7. 2,5-di(lower alkoxy)-3,4-dihydroxytetrahydrofuran.
8. A method for the production of a 2,5-dialkoxy-3,4-dihydroxytetrahydrofuran which comprises treating a 2,5-dialkoxy-2,5-dihydrofuran of the general formula

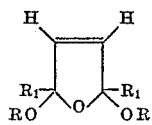

with potassium permanganate in an aqueous solution at a temperature below 5° C., where R is an alkyl group containing less than 7 carbon atoms and R$_1$ is selected from the group consisting of hydrogen, an alkyl group containing less than 4 carbon atoms, and the following saturated aliphatic groups comprising carbon, hydrogen and oxygen only, containing less than 4 carbon atoms: —CH$_2$—O (lower fatty acid acyl); —CH(O-lower alkyl)$_2$; and —COO-(lower alkyl).

9. The method of claim 8, wherein the tetrahydrofuran is further hydrolyzed to a dicarbonyl compound.

References Cited in the file of this patent

Sheehan et al.: JACS 74, pp. 3825–28 (rec'd Jan. 7, 1952). Bergmann et al.: Berichte 63, pp. 1911–17 (1930).